United States Patent
Mendel

(10) Patent No.: US 9,344,278 B2
(45) Date of Patent: May 17, 2016

(54) SECURE DATA TRANSFER USING RANDOM ORDERING AND RANDOM BLOCK SIZING

(75) Inventor: Jacob Mendel, Kibbutz Givat Brenner (IL)

(73) Assignee: Broadcom Corporation, Irvine, CA (US)

( * ) Notice: Subject to any disclaimer, the term of this patent is extended or adjusted under 35 U.S.C. 154(b) by 13 days.

(21) Appl. No.: 13/470,840

(22) Filed: May 14, 2012

(65) Prior Publication Data

US 2013/0094650 A1 Apr. 18, 2013

Related U.S. Application Data

(60) Provisional application No. 61/548,471, filed on Oct. 18, 2011.

(51) Int. Cl.
| | |
|---|---|
| *H04L 9/00* | (2006.01) |
| *H04L 9/28* | (2006.01) |
| *H04L 9/32* | (2006.01) |
| *H04L 29/06* | (2006.01) |
| *H04L 25/03* | (2006.01) |

(Continued)

(52) U.S. Cl.
CPC ............. *H04L 9/3215* (2013.01); *H04L 9/002* (2013.01); *H04L 63/0435* (2013.01); *H04L 9/06* (2013.01); *H04L 9/0606* (2013.01); *H04L 9/0618* (2013.01); *H04L 9/18* (2013.01); *H04L 25/03866* (2013.01)

(58) Field of Classification Search
CPC ... H04L 25/03866; H04L 9/0618; H04L 9/18; H04L 9/06; H04L 9/0606
USPC ........................................... 380/255, 268, 28
See application file for complete search history.

(56) References Cited

U.S. PATENT DOCUMENTS

| | | | |
|---|---|---|---|
| 7,693,278 B2 | 4/2010 | Hiramatsu et al. | |
| 8,345,735 B2* | 1/2013 | Kang et al. | 375/224 |

(Continued)

FOREIGN PATENT DOCUMENTS

| | | |
|---|---|---|
| CN | 1909443 A | 12/2005 |
| WO | WO 00/04681 A1 | 1/2000 |

OTHER PUBLICATIONS

European Search Report for European Patent Application No. EP 12 00 6104, Munich, Germany, mailed on Jan. 4, 2013.

(Continued)

*Primary Examiner* — Aravind Moorthy
(74) *Attorney, Agent, or Firm* — Sterne, Kessler, Goldstein & Fox PLLC

(57) ABSTRACT

Encrypted information is conventionally broken into blocks which are transmitted sequentially. Because the order and the size of such blocks can be easily determined, an eavesdropper can gain valuable information regarding the content of the communication. More specifically, if known types of information exist within a block, the encryption key may be determined allowing the content of other encrypted blocks to be obtained. Embodiments of a system, method and computer program product described herein can overcome this deficiency by securely transferring information through random ordering and random block sizing. An original data set to be transferred is divided into a plurality of blocks, where at least two blocks have different sizes. The blocks are encrypted and inserted into a sequence of data transfer slots. The blocks are then selected for transfer in random order by selecting a slot to transfer based on a generated random number.

19 Claims, 9 Drawing Sheets

(51) Int. Cl.
*H04L 9/18* (2006.01)
*H04L 9/06* (2006.01)

(56) References Cited

U.S. PATENT DOCUMENTS

| | | | |
|---|---|---|---|
| 2002/0046359 A1* | 4/2002 | Boden | 714/6 |
| 2002/0159545 A1* | 10/2002 | Ramesh et al. | 375/340 |
| 2003/0208693 A1 | 11/2003 | Yoshida | |
| 2006/0015945 A1* | 1/2006 | Fields | 726/27 |
| 2007/0041396 A1* | 2/2007 | Kanajan | 370/442 |
| 2009/0031059 A1* | 1/2009 | Gallagher et al. | 710/56 |
| 2009/0094507 A1* | 4/2009 | Nakase | 714/807 |
| 2010/0124332 A1 | 5/2010 | Arena | |
| 2010/0199025 A1* | 8/2010 | Nanjou et al. | 711/103 |
| 2010/0322290 A1 | 12/2010 | Kang et al. | |
| 2011/0252480 A1* | 10/2011 | Patawaran et al. | 726/26 |
| 2012/0089829 A1* | 4/2012 | Kholidy | 713/153 |
| 2012/0265947 A1* | 10/2012 | Colombo et al. | 711/154 |

OTHER PUBLICATIONS

Office Action directed to related Taiwanese Patent Application No. 101133998, mailed Dec. 26, 2014; 5 pages.

Office Action directed to related Chinese Patent Application No. 201210366415.1, mailed Jan. 15, 2015; 6 pages.

* cited by examiner

SECURE DATA TRANSFER USING RANDOM ORDERING AND RANDOM BLOCK SIZING

CROSS REFERENCE TO RELATED APPLICATIONS

This application claims the benefit of U.S. Provisional Application. No. 61/548,471, filed on Oct. 18, 2011, which is incorporated herein by reference in its entirety.

FIELD OF THE INVENTION

This application relates generally to data communications and more specifically to information security.

BACKGROUND OF THE INVENTION

The use of computer technologies to transfer financial and other valuable information continues to increase. Because of the nature of these transfers, protecting the information in transit from disclosure to unauthorized parties is critical. Encryption has traditionally been used to provide security for these communications.

Whether or not encryption is employed, a transfer of data is conventionally achieved by breaking the data into blocks and transferring the blocks sequentially. The information in each block is typically the same size. Because the order and the size of such blocks can be easily determined, even when encrypted, an eavesdropper can gain valuable information regarding the content of the communication. More specifically, if known types of information exist within a block, the encryption key may be determined allowing the content of other blocks encrypted using the same key to be obtained.

The problem is exacerbated when there is a distribution of multiple copies of the same content. For example, a digital book delivery service distributes multiple copies of a digital book to customers. Each copy may be encrypted by a different key. Because an eavesdropper has access to known data (e.g. page one of the book), which is encrypted multiple times with different keys, the eavesdropper may be able to recover the key that was used to encrypt that data. The eavesdropper can then use that key to decrypt the rest of the data.

What is therefore needed is a system for securely transferring and storing data containing known types of information.

BRIEF DESCRIPTION OF THE DRAWINGS

The accompanying drawings, which are incorporated herein and form a part of the specification, illustrate the present invention and, together with the description, further serve to explain the principles of the invention and to enable a person of ordinary skill in the relevant art to make and use the invention.

DETAILED DESCRIPTION

Figure 1:
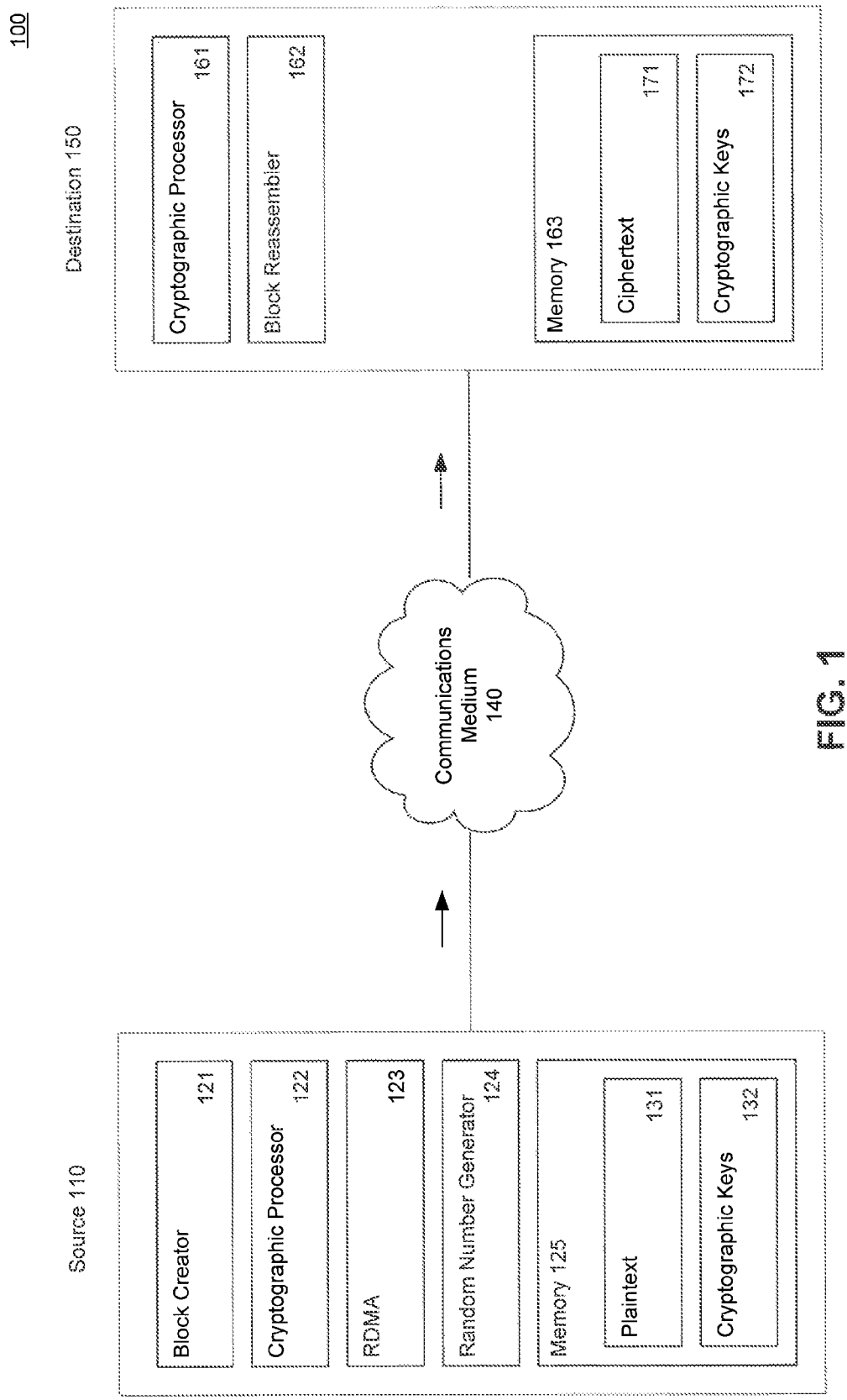
FIG. 1 is a block diagram of an exemplary operating environment for the system for secure data transfer using random ordering and random block sizing, according to an embodiment of the invention.

FIG. 1 is a block diagram of an exemplary operating environment for the system for secure data transfer using random ordering and random block sizing, according to an embodiment of the invention. Exemplary operating environment 100 includes a source 110, a communications medium 140, and a destination 150.

Source 110 includes a block creator 121, a cryptographic processor 122, a random direct memory access (RDMA) module 123, a random number generator 124, and a memory 125. Memory 125 is configured to store plaintext 131 and one or more cryptographic keys 132. Plaintext 131 is data that is not encrypted. A cryptographic key 132 is used by the cryptographic processor to cryptographically process data (e.g. encrypt or decrypt). A cryptographic key may be a symmetric key or an asymmetric key as required by the cryptographic algorithm. Although memory 125 is typically RAM, as would be appreciated by persons of skill in the art, memory 125 may be any type of storage and may be internal or external to cryptographic processor 122. Block creator 121 is configured to divide plaintext 131 into one or more variable size blocks. The operation of block creator 121 is described in further detail in FIG. 3 below.

Cryptographic processor 122 provides the required cryptographic operations to cryptographically process the one or more variable size blocks generated by block creator 121. The cryptographic processor may support a variety of cryptographic algorithms including symmetric algorithms such as AES, Triple DES and DES or asymmetric algorithms such as DSA or RSA. The cryptographic processor may support stream ciphers such as RC4. In embodiments, cryptographic processor may also perform cryptographic hash functions. Various size keys may be used with the cryptographic processor, as required by the algorithm.

RDMA 123 is configured to transfer the encrypted blocks of data in random order over communications medium 140. The operation of RDMA 123 is described in further detail in FIG. 3 below.

In an embodiment, source 110 securely transmits ciphertext to destination 150 via a communications medium 140. Communications medium 140 may be a public data communications network such as the Internet, a private data communications network, the Public Switched Telephone Network (PSTN), a wireless communications network, a computer bus, a circuit pathway, or any combination thereof. The interface between data source 110 and communication medium 140 may be a wireless or wired interface.

Destination 150 includes a cryptographic processor 161, a block reassembler 162, and a memory 163. Destination 150 may be located in a physically separate place than source 110.

Cryptographic processor 161 is configured to cryptographically process (e.g. decrypt) the one or more variable size blocks sent by data source 110. In order to decrypt received encrypted data, destination 150 stores one or more cryptographic keys. As would be apparent to persons skilled in the relevant art(s), a variety of techniques for the exchange cryptographic keys and other required information between source 110 and destination 150 could be used with the present invention.

Block reassembler 162 is configured to reorder the variable size blocks to their original positions. The operation of block reassembler 162 is described in further detail in FIG. 9 below.

Memory 163 is configured to store ciphertext 171 and one or more cryptographic keys 172. In an embodiment, ciphertext may be stored prior to decryption. Alternatively, ciphertext and the resulting plaintext stored. Although memory 163 is typically RAM, as would be appreciated by persons of skill in the art, memory 163 can be any type of storage and may be internal or external to cryptographic processor 161.

Ciphertext 171 includes the one or more encrypted blocks sent by source 110. Cryptographic key 172 is a piece of information that in combination with ciphertext 171 generates plaintext 131 when processed by cryptographic processor 161. The key may be a symmetric key or an asymmetric key as required by the cryptographic algorithm.

Figure 2:
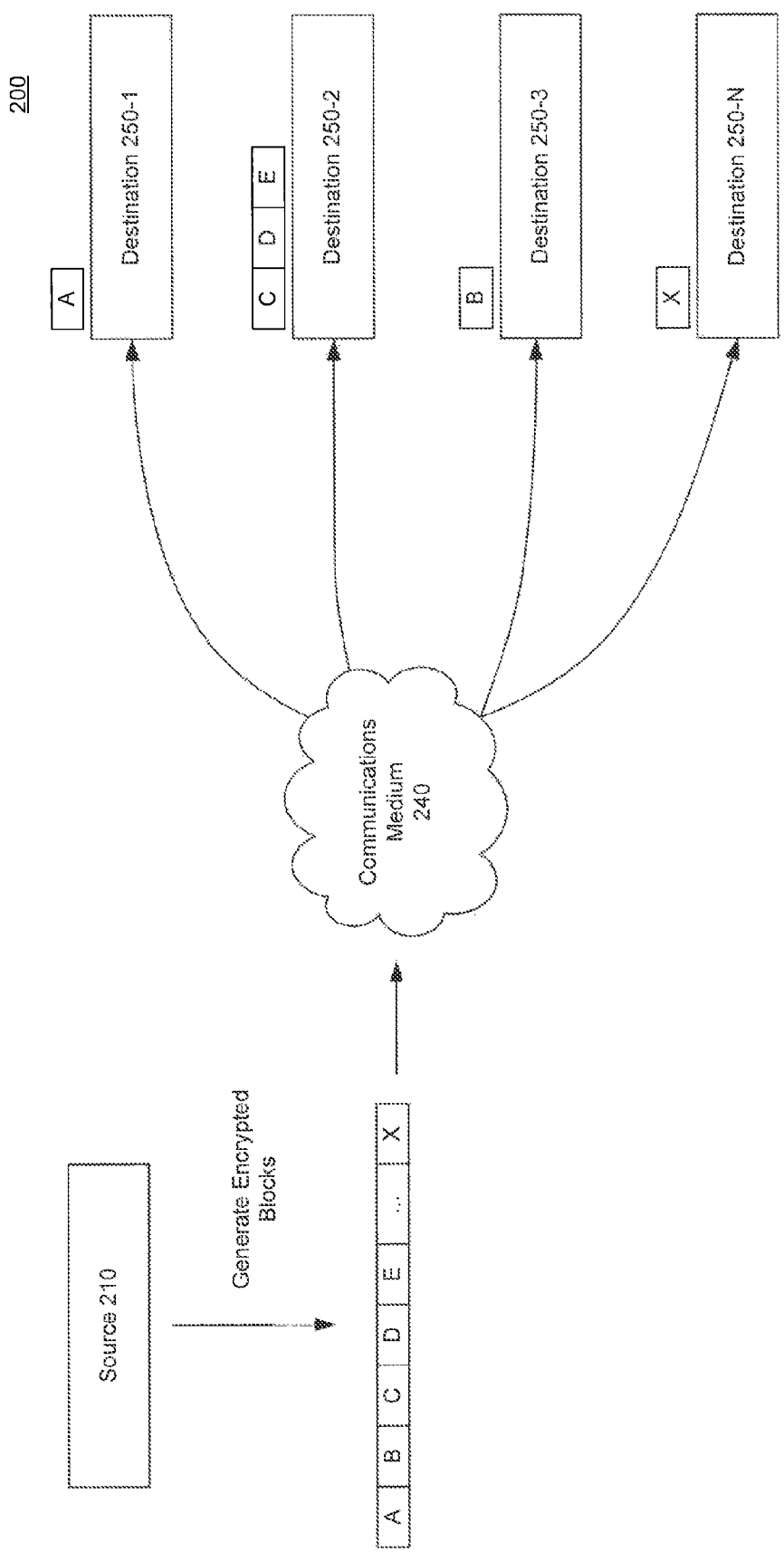
FIG. 2 is a block diagram of an alternate operating environment for the system for secure data transfer using random ordering and random block sizing, according to an embodiment of the invention.

The techniques described herein may also be used to enhance security for disaster recovery. FIG. 2 depicts a block diagram of the present invention system for secure data transfer and storage, according to an embodiment of the invention. Operating environment 200 includes a source 210, a communications medium 240, and destinations 250-1 to 250-N. Source 210 and communications medium 240 were described above in reference to FIG. 1. In environment 200, original data is split by the source into a plurality of encrypted blocks and the blocks are distributed to a plurality of destinations. For example, in FIG. 2 encrypted block A is stored at destination 250-1, encrypted block is stored at destination 250-3, encrypted blocks C, D, and E are stored at destination 250-2, and encrypted block X is stored at destination 250-N. This distributed embodiment provides an additional level of security.

Destinations 250-1 to 250-N may include the same functionality as destination 150 as discussed in FIG. 1. In this embodiment, however, encrypted blocks of ciphertext 171 are distributed across destinations 250-1 to 250-N such that each data destination includes a set of the blocks. The distribution of ciphertext 171 across destinations 250-1 to 250-N ensures that at least a portion of the original data can be recovered even if one or more destinations are lost. Additionally, because storage is distributed, a security breach at one destination may not compromise all of the original data.

Figure 3:
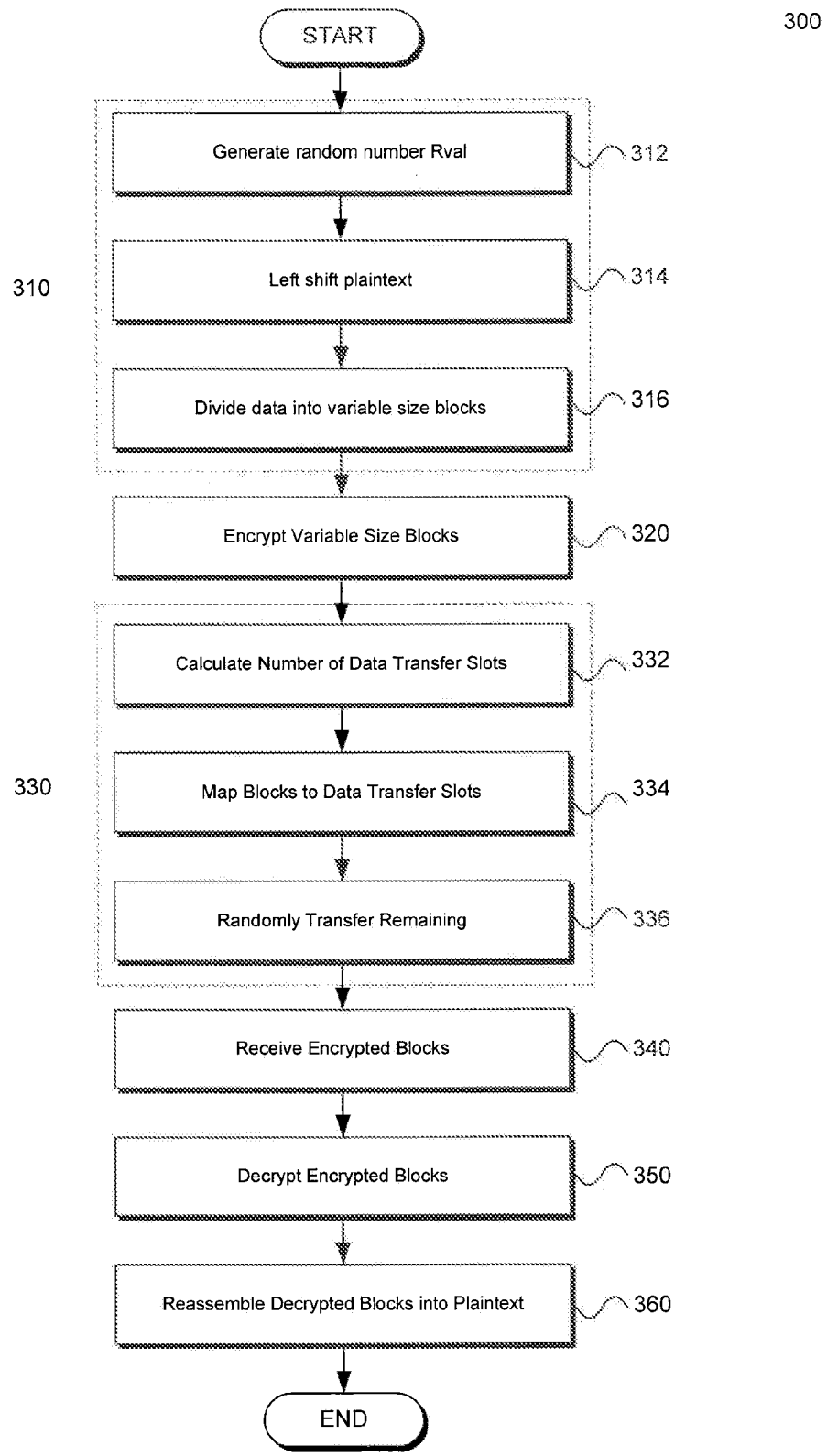
FIG. 3 is a flowchart of an illustrative method for securely transmitting data, according to an embodiment of the present invention.

FIG. 3 is a flowchart of an exemplary method 300 for securely transmitting data according to embodiments of the present invention. Other structural embodiments will be apparent to persons skilled in the relevant art(s) based on the following discussion. The operations shown in FIG. 3 need not occur in the order shown, nor does method 300 require all of the operations shown in FIG. 3 be performed. The operations of FIG. 3 are described in detail below.

In step 310, all or a portion of plaintext 131 is divided into a plurality of variable size blocks. Step 310 includes steps 312-316.

In an embodiment, during step 310, the plaintext may be shifted by a random number of bytes. Alternatively, the plaintext may be shifted by a random number of bits. Randomly shifting the plaintext provides additional data security, particularly when transmitting multiple copies of plaintext 131, because the first byte or bit transmitted will likely be different from transmission to transmission.

In step 312, a random or pseudorandom number, Rval, is generated by random number generator 124. Random number, Rval, is then used to determine the shift amount. For example, the shift amount may be calculated as follows:

$$\text{Shift\_Amount} = \text{mod}(Rval, \text{Plaintext\_length})$$

Figure 4A:
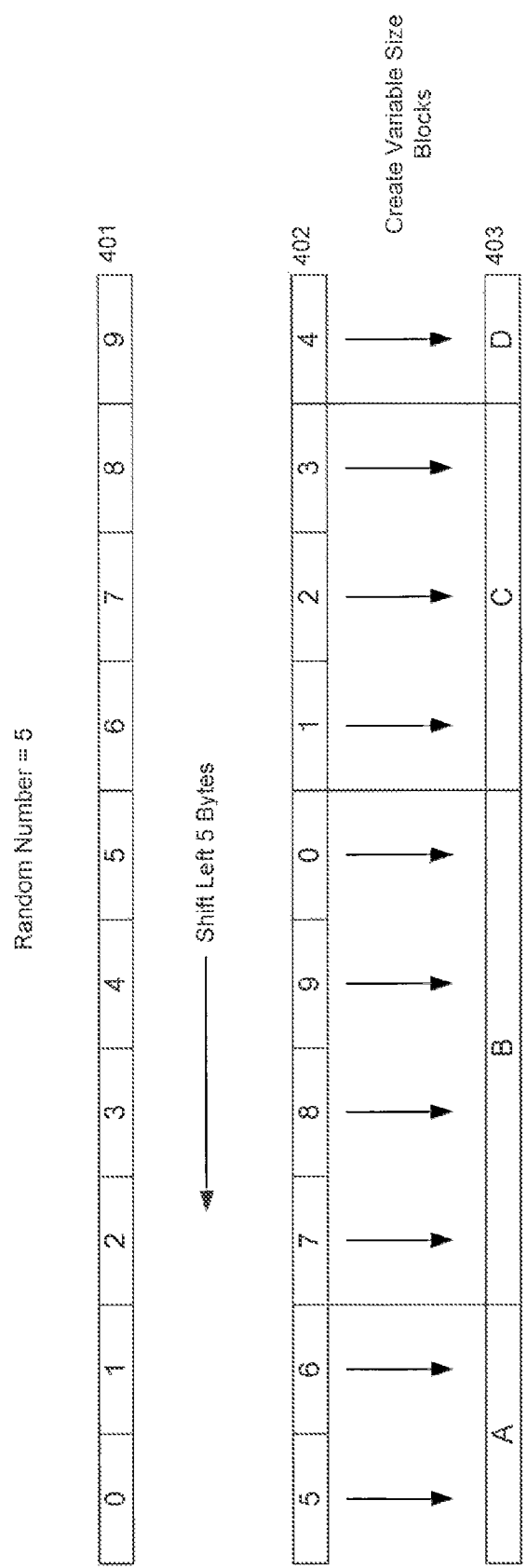
FIG. 4A is an illustrative example of the method for division of plaintext into variable size blocks, according to an embodiment of the present invention.

In step 314, plaintext 131 is shifted by Shift_Amount bytes. In embodiments, the bytes are shifted left. As would be appreciated by a person of ordinary skill in the art other techniques for shifting data could be used. FIG. 4A depicts an illustrative example dividing plaintext into variable sized blocks, according to embodiments of the invention. In FIG. 4A, the system has generated the shift amount of 5 for the data. Plaintext 401 is shifted to the left by 5 bytes to produce shifted text 402. The bytes shifted in from the right are the bytes shifted out on the left. In other words, a circular shift is applied.

In step 316, plaintext is divided into a plurality of variable size blocks. More specifically, the size of each block in bytes is based on a random number generated by random number generator 124. Each block must be at least one byte in size but less than or equal to the size of a single data transfer slot. For example, in FIG. 4A bytes 5 and 6 from plaintext 402 constitute a transfer block and bytes 7, 8, 9, and 0 constitute another transfer block.

Figure 4B:
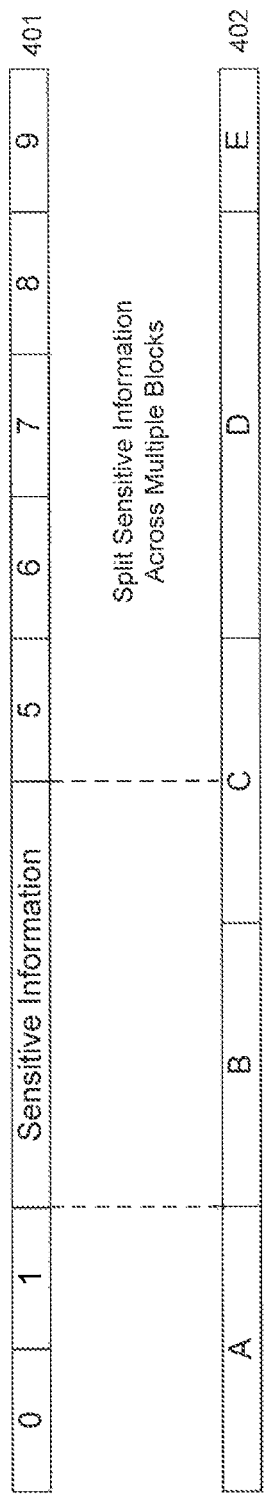
FIG. 4B is an illustrative example of an optional step of the method for division of plaintext into variable size blocks, according to an embodiment of the present invention.

If additional data security is required, block creator 123 may split sensitive information within the plaintext across blocks. In other words, to prevent sensitive information from being stored in a single block, block creator 123 divides the sensitive information at a random location. FIG. 4B depicts an illustrative example of an optional step of splitting sensitive information within the plaintext across blocks, according to an embodiment of the present invention. In FIG. 4B block creator 123 splits the sensitive information in plaintext 501 across blocks B and C. The location for the shift is determined based on a random number generated by random number generator 124. As would be apparent to persons skilled in the relevant arts, various mechanisms may be used to inform block creator 123 about the location of sensitive information in the plaintext.

In step 320, cryptographic processor 122 encrypts the plurality of variable size blocks with one or more cryptographic keys 132. As would be apparent to persons skilled in the relevant art(s), portions of step 310 and 320 may be performed sequentially or simultaneously depending on the requirement of the cryptographic algorithm being used. In other words, cryptographic processor 122 may encrypt the variable size blocks as they are produced by block creator 121. Alternatively, cryptographic processor 122 may encrypt the variable size blocks after all the blocks have been produced by block creator 121.

In step 330, the encrypted blocks are transferred to the destination. In an embodiment, the encrypted blocks may be transferred out-of-order. More specifically, a set of the encrypted blocks is mapped to a plurality of data transfer slots. RDMA 123 randomly picks a data transfer slot and transmits the encrypted block therein to the destination. Step 330 includes steps 332-336.

Traditionally, encrypted blocks are sent in sequential order to the destination. RDMA 123, however, is configured to transmit the encrypted blocks out-of-order to one or more destinations. Moreover, in an embodiment multiple channels are used to transmit the encrypted blocks. In order words, in addition to being sent out-of-order, the encrypted blocks are spread over multiple channels based on time, frequency or any combination thereof.

In step 332, the number of data transfer slots is determined. The data transfer slots are used to send a set of the encrypted blocks. Each data transfer slot may have a slot number that represents its ordinal position.

In order to increase security, the number of data transfer slots is based on a random number generated by random number generator 124. Moreover, the number of data transfer slots is recalculated once the set of encrypted blocks assigned to the data transfer slots are transmitted. By calculating a random data transfer slot range for each set of encrypted blocks, security is increased.

When the encrypted blocks are to be distributed to a plurality of destinations, the encrypted blocks in the data transfer slots would preferably be sent to the same destination. However, as would be apparent to persons skilled in the relevant arts, various methods and data structures may be used to send data in different data transfer slots to different destinations.

The number of data transfer slots may be calculated by the following formula:

$$SQ = \mathrm{mod}(Rval, SQ\max - Sq\min) + SQ\min$$

Rval is the random number generated by random number generator 124. SQmax and SQmin are the maximum and minimum number of data transfer slots. SQ is the number of data transfer slots to be used for transmission. SQ is in the range of SQmin and SQmax. As previously discussed, the value of SQ may vary with each transmission in order to increase data security.

In step 334, the encrypted blocks are mapped sequentially to the data transfer slots. Encrypted block 1 is mapped to data transfer slot 1, encrypted block 2 is mapped to data transfer slot 2, and so on.

Figure 6:
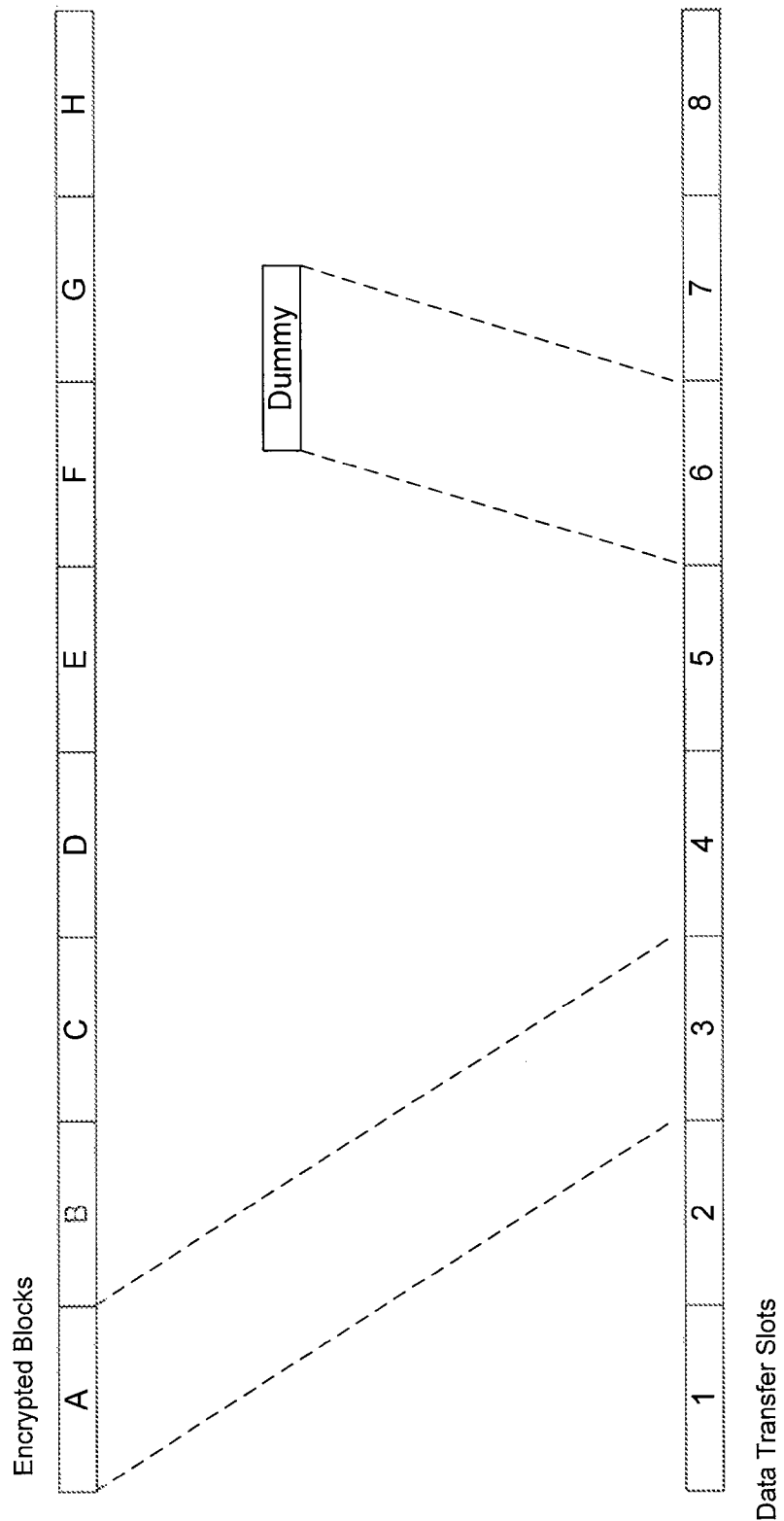
FIG. 6 is an illustrative example of the method for randomly transferring the encrypted blocks out-of-order, according to an embodiment of the present invention.

If additional data security is required, RDMA 123 may generate one or more dummy blocks prior to data transfer. RDMA 123 randomly maps the one or more dummy blocks to one or more data transfer slots. For example, in FIG. 6 a dummy block is mapped to data transfer slot 6. As would be apparent to persons skilled in the relevant arts, various methods may be utilized to randomly map the one or more dummy blocks to one or more data transfer slots.

The one or more dummy blocks represent spurious data. By sending one or more dummy blocks, a third-party who intercepts a block will be unable to determine whether the block represents legitimate data. The use of dummy blocks, however, decreases data throughout. Therefore, as would be apparent to persons skilled in the relevant art, the use of dummy blocks represents a balance between data security and transmission speed.

In step 336, an encrypted block that has not been transmitted is selected and transferred. The random block transfer operation is described in further detail in FIG. 5 below.

In step 340, destination 150 receives the encrypted block and stores it in memory 163. Destination 150 also receives the data slot number associated with the encrypted block.

In step 350, the cryptographic processor 161 decrypts the encrypted block using cryptographic key 172. This results in the original variable size block. As would be apparent to persons skilled in the relevant art(s), there are various mechanisms to securely exchange cryptographic keys between the source and destination.

Figure 7:
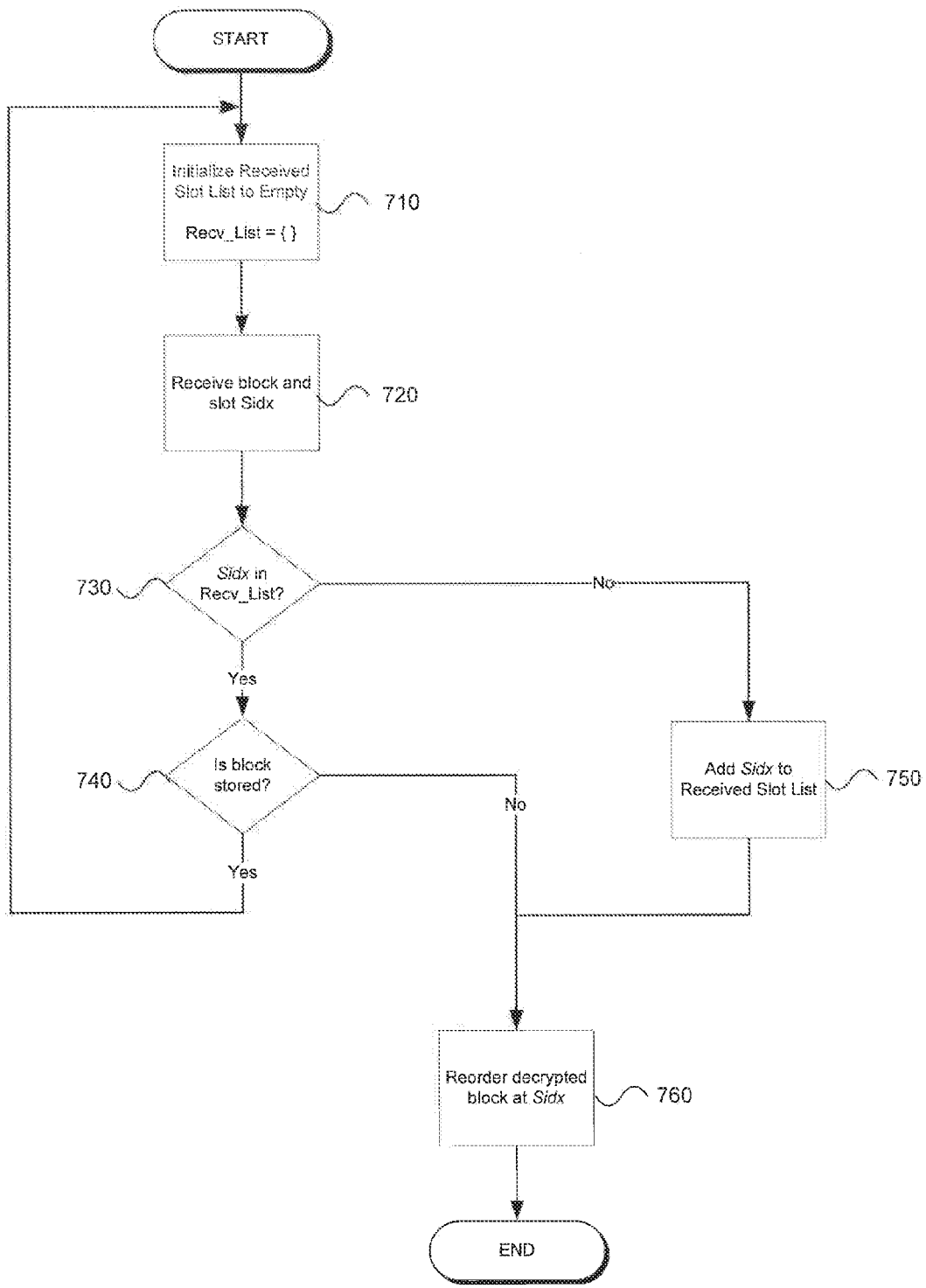
FIG. 7 is a flowchart of an illustrative method for reassembling the variable size blocks, according to an embodiment of the present invention.

In step 360, block reassembler 162 orders the decrypted variable size block according to the received data slot number. The operation of block reassembler 162 is described in further detail in. FIG. 7 below.

As would be apparent to persons skilled in the relevant art(s), steps 350 and 360 may be performed sequentially or simultaneously.

Figure 5:
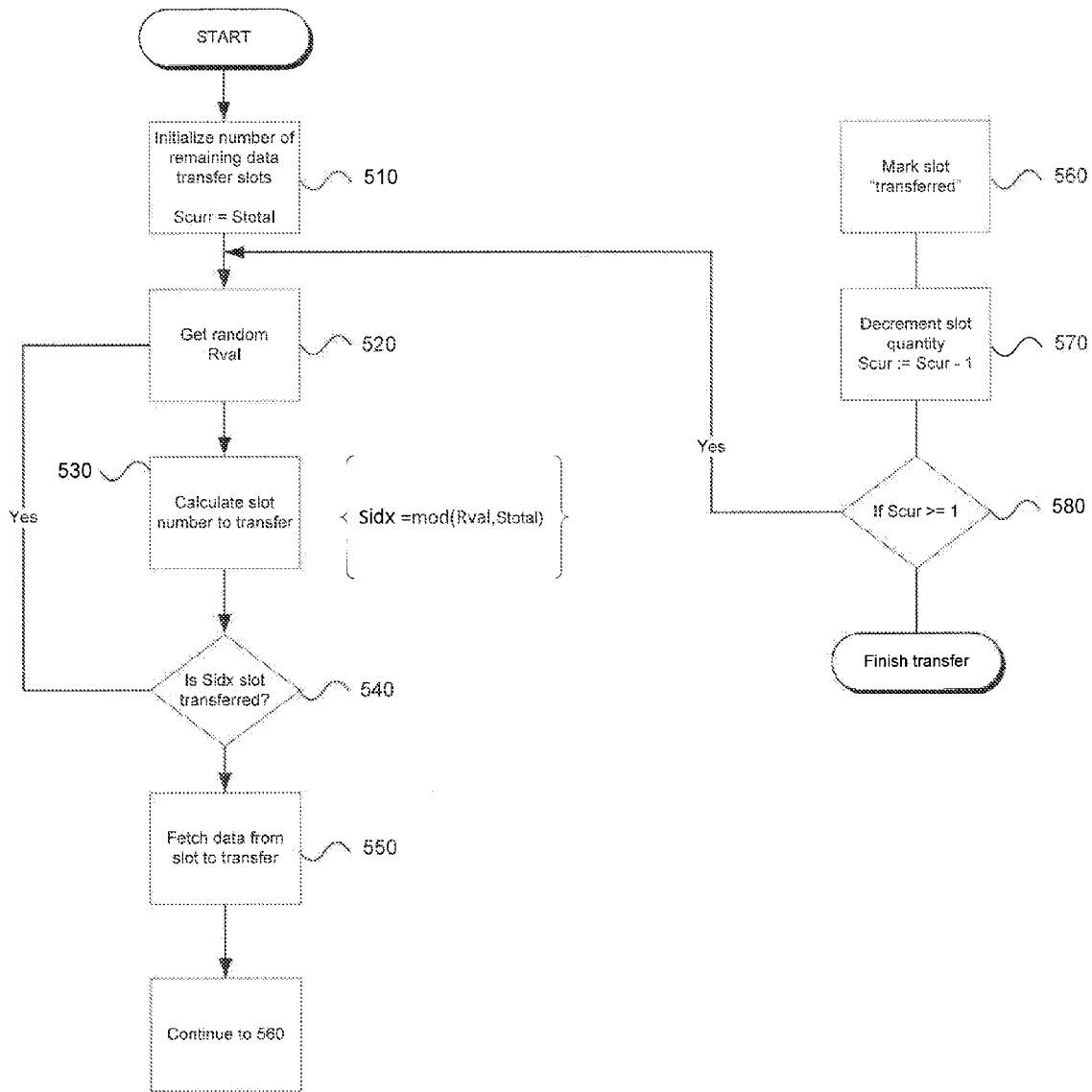
FIG. 5 depicts a flowchart of a step of the method for randomly transferring the encrypted blocks out-of-order, according to an embodiment of the present invention.

FIG. 5. depicts a flowchart of step 336 of the method for randomly transferring the encrypted blocks according to an embodiment of the present invention. Other structural embodiments will be apparent to persons skilled in the relevant art(s) based on the following discussion. The operations shown in FIG. 5 need not occur in the order shown, nor does method 500 require all of the operations shown in FIG. 5 be performed. The operations of FIG. 5 are described in detail below.

In step 510, the number of data transfer slots remaining to be transferred, e.g. Scurr, is initialized to the number of data transfer slots calculated in step 332 of FIG. 3.

In step 520, a random number, e.g. Rval, is generated by random number generator 124.

In step 530, random number Rval is used to calculate the data transfer slot to transfer. More specifically, the slot number of the data transfer slot to transfer is calculated based on Rval. The data transfer slot number may be calculated as follows:

$$Sidx = \mathrm{mod}(Rval, SQ)$$

Rval is the random number generated by random number generator 124. SQ is the number of data transfer slots calculated in step 332. Sidx is the slot number of the data transfer slot to transfer.

In an alternate embodiment, the data transfer slot number may be chosen based on other factors. For example, the data transfer slot number may be chosen based on a block's transmission priority or the user sending the block. As would be apparent to persons skilled in the relevant arts, transmission priority may reflect the type of data in the block, the cost of transmission of that block, or any combination thereof.

In step 540, a determination is made whether the encrypted block mapped to data transfer slot Sidx has been previously transferred. If the encrypted block has been transferred, the process returns to step 520.

In step 550, the encrypted block mapped to data transfer slot Sidx is transmitted to the destination. The data transfer slot number, e.g. Sidx, is also sent to the destination. In a preferred embodiment, Sidx is sent to the destination via a different communication channel as the encrypted block.

In step 560, the data transfer slot is marked as transferred. This prevents the encrypted block from being retransmitted.

In step 570, the number of slots remaining to be transferred, e.g. Scurr, is decremented.

In step 580, if slots remain to be transferred (e.g. Scurr is greater than or equal 1), operation returns to step 520 where another slot is selected and its corresponding data transferred. Steps 520-580 are repeated until each available slot has been selected.

As would be apparent to persons skilled in the relevant arts, the encrypted blocks may be transferred one at a time. Alternatively, multiple encrypted blocks may be transferred simultaneously.

If additional security is required, the encrypted blocks may also be distributed across a plurality of independent channels. In other words, the encrypted blocks may be spread out over time, frequency, or any combination thereof.

FIG. 7. depicts a flowchart of an illustrative method for reassembling the variable size blocks, according to an embodiment of the present invention. Other structural embodiments will be apparent to persons skilled in the relevant art(s) based on the following discussion. The operations shown in FIG. 7 need not occur in the order shown, nor does method 700 require all of the operations shown in FIG. 7 be performed. The operations of FIG. 7 are described in detail below.

In step 710, the received slot number list, e.g. Recv_List, is set to empty. Recv_List contains received data transfer slot numbers. Recv_List is used to determine whether source 110 has completed transferring encrypted blocks from the data transfer slots. As would be apparent to persons skilled in the relevant arts, the received slot number list may be implemented and provided to the destination or destinations using various methods and data structures.

In step 720, a decrypted block and its associated data slot number, e.g. Sidx, are received.

In step 730, block reassembler 162 determines whether Sidx is in the received slot number list. If Sidx is not in the list, operation continues to step 750. If Sidx is in the list, the decrypted block is either being retransmitted or source 110 has begun transferring encrypted blocks from a new range of data transfer slots.

In step 740, block reassembler 162 determines whether the decrypted block has already been stored at position Sidx amongst the other decrypted blocks. If the decrypted block has not been stored, the block was retransmitted and operation continues to step 760. If a block has been stored at Sidx, source 110 has begun transferring encrypted blocks from a new range of data transfer slots and operation returns to step 710.

In step 750, Sidx is added to the received slot number list, e.g. Recv_List.

In step 760, block reassembler 162 reorders the decrypted block at position Sidx amongst the other decrypted blocks. As would be apparent to persons skilled in the relevant arts, various methods and data structures may be used to order the decrypted blocks by data transfer slot numbers. For example, the decrypted block may be assigned to offset Sidx of an array.

As would be appreciated by a person skilled in the relevant art, the operation of block reassembler 162 may be extended to handle reassembly of blocks into plaintext where the blocks are distributed across multiple destinations as described in FIG. 2. For example, in the preferred embodiment where each data transfer slot in the set of data transfer slots is to be sent to the same destination, the beginning offset of the contiguous piece of plaintext that is stored in the data transfer slots could be sent to the destination. Each piece of plaintext reassembled at the destinations could then be merged, based on the offset, into the plaintext.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 8:
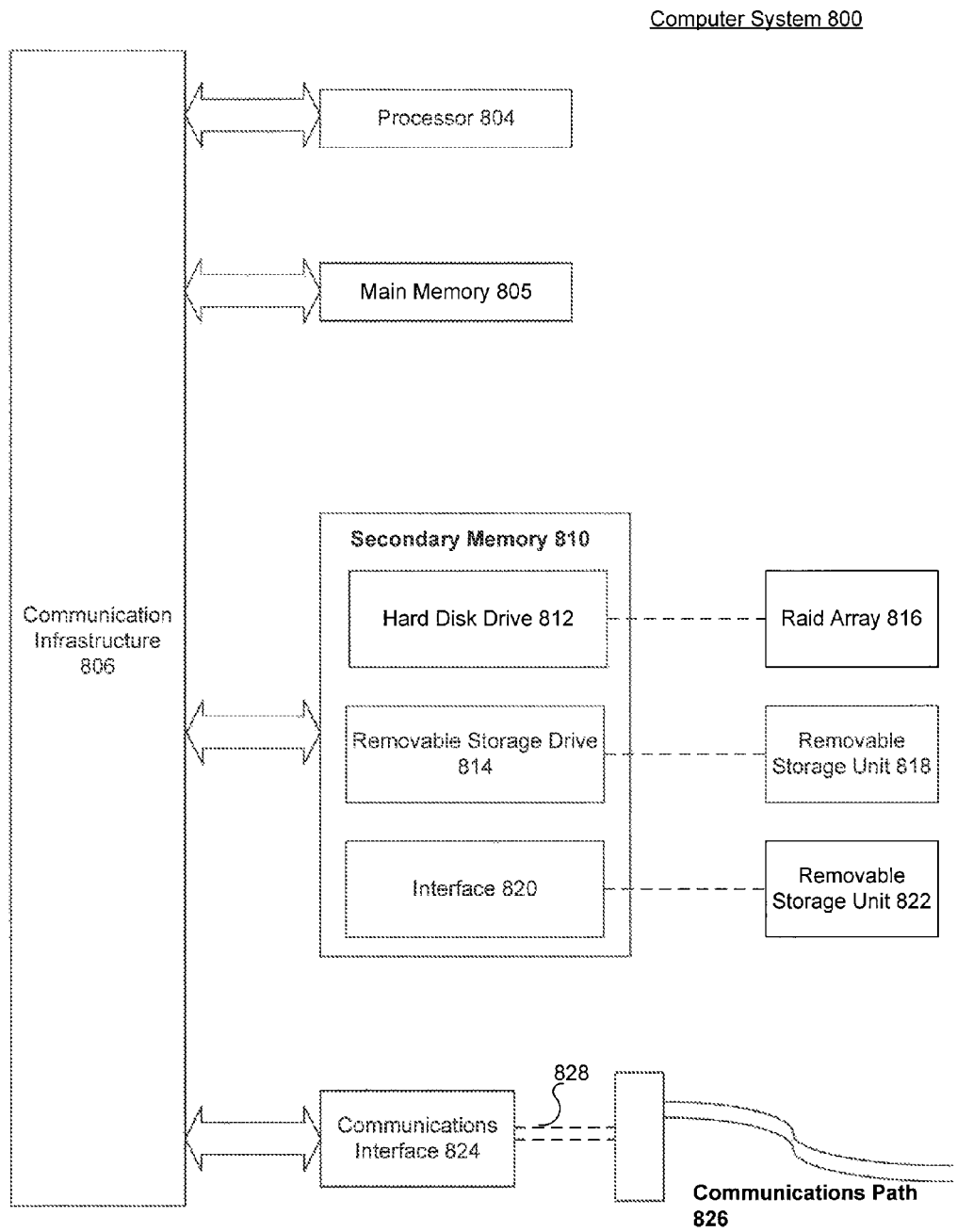
FIG. 8 illustrates a block diagram of an exemplary computer system on which the embodiments can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 800 is shown in FIG. 8. The computer system 800 includes one or more processors, such as processor 804. Processor 804 can be a special purpose or a general purpose digital signal processor. The processor 804 is connected to a communication infrastructure 806 (for example, a bus or network). Various software implementations are described in terms of this exemplary computer system. After reading this description, it will become apparent to a person skilled in the relevant art how to implement the disclosure using other computer systems and/or computer architectures.

Computer system 800 also includes a main memory 805, preferably random access memory (RAM), and may also include a secondary memory 810. The secondary memory 810 may include, for example, a hard disk drive 812, and/or a RAID array 816, and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

The terms "computer program medium" and "computer usable medium" are used herein to generally refer to media such as removable storage drive 814, a hard disk installed in hard disk drive 812, and signals 828. These computer program products are means for providing software to computer system 800.

Computer programs (also called computer control logic) are stored in main memory 805 and/or secondary memory 810. Computer programs may also be received via communications interface 824. Such computer programs, when executed, enable the computer system 800 to implement the present disclosure as discussed herein. In particular, the computer programs, when executed, enable the processor 804 to implement the processes of the present disclosure. For example, when executed, the computer programs enable processor 804 to implement part of or all of the steps described above with reference to the flowcharts herein. Where the disclosure is implemented using software, the software may be stored in a computer program product and loaded into computer system 800 using raid array 816, removable storage drive 814, hard drive 812 or communications interface 824.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A device for secure data transfer of a plurality of portions of data from a data set comprising:
   a first module configured to, for each portion of data in the plurality of portions of data from the data set:
      select the portion of data from the data set, and
      divide the portion of data into a plurality of blocks, wherein at least two blocks in the plurality of blocks have different sizes;
   a hardware-based cryptographic processor configured to encrypt the plurality of blocks for each portion of data; and
   a second module configured to, for each transfer of a portion of data in the plurality of portions of data from the data set:
      determine a number of data transfer slots based on a first generated random number,
      map the plurality of blocks into the determined number of data transfer slots, and
      transfer the plurality of blocks in random order to a destination via the determined number of data transfer slots,
      wherein the determined number of data transfer slots is variable for each transfer of a portion of data.

2. The device of claim 1, wherein the first module is further configured to apply a circular shift to the portion of data prior to dividing the portion of data into the plurality of blocks.

3. The device of claim 1, wherein the first module is further configured to split a set of identified data in the portion of data between two blocks.

4. The device of claim 1, wherein the second module is further configured to include a dummy block in the plurality of blocks during transfer.

5. The device of claim 1, wherein the second module is further configured to select a data transfer slot in the determined number of data transfer slots based on a second generated random number.

6. The device of claim 5, wherein the second module is further configured to transfer a block associated with the selected data transfer slot.

7. The device of claim 1, wherein the second module is further configured to select a data transfer slot in the determined number of data transfer slots based on a transmission priority of a block in the plurality of blocks.

8. A non-transitory computer useable medium having program logic stored thereon that, when executed by a processor, causes the processor to perform a method for securely transferring a plurality of portions of data from a data set, the method comprising:
   for each portion of data in the plurality of portions of data from the data set, selecting the portion of data from the data set;
   dividing the selected portion of data into a plurality of blocks, wherein at least two blocks in the plurality of blocks have different sizes;
   encrypting, in a hardware-based cryptographic processor, the plurality of blocks for each portion of data;
   for each transfer of a portion of data in the plurality of portions of data front the data set, determining a number of data transfer slots based on a first generated random number;
   mapping the plurality of blocks into the determined number of data transfer slots; and
   transferring the plurality of blocks in random order to a destination via the determined number of data transfer slots, wherein the determined number of data transfer slots is variable for each transfer of a portion of data.

9. The computer useable medium recited in claim 8, wherein a circular shift is applied to the portion of data prior to dividing the portion of data into the plurality of blocks.

10. The computer useable medium recited in claim 8, wherein a set of identified data in the portion of data is split between two blocks.

11. The computer useable medium recited in claim 8, wherein a data transfer slot in the determined number of data transfer slots is selected based on a second generated random number.

12. The computer useable medium recited in claim 11, wherein a block associated with the selected data transfer slot is transferred.

13. The computer useable medium recited in claim 8, wherein a data transfer slot in the determined number of data transfer slots is selected based on a transmission priority of a block in the plurality of blocks.

14. A method for secure data transfer of a plurality of portions of data from a data set comprising:
   for each portion of data in the plurality of portions of data from the data set, selecting the portion of data from the data set;
   dividing the selected portion of data into a plurality of blocks, wherein at least two blocks in the plurality of blocks have different sizes;
   encrypting, in a hardware-based cryptographic is processor, the plurality of blocks for each portion of data;

for each transfer of a portion of data in the plurality of portions of data from the data set, determining a number of data transfer slots based on a first generated random number;

mapping the plurality of blocks into the determined number of data transfer slots; and transferring the plurality of blocks in random order to a destination via the determined number of data transfer slots, wherein the determined number of data transfer slots is variable for each transfer of a portion of data.

15. The method recited in claim 14, wherein a circular shift is applied to the portion of data prior to dividing the portion of data into the plurality of blocks.

16. The method recited in claim 14, wherein a set of identified data in the portion of data is split between two blocks.

17. The method recited in claim 14, wherein a data transfer slot in the determined number of data transfer slots is selected based on a second generated random number.

18. The method recited in claim 17, wherein a block associated with the selected data transfer slot is transferred.

19. The method recited in claim 14, wherein a data transfer slot in the determined number of data transfer slots is selected based on a transmission priority of a block in the plurality of blocks.

* * * * *